US010921912B2

(12) United States Patent
Kumar et al.

(10) Patent No.: US 10,921,912 B2
(45) Date of Patent: Feb. 16, 2021

(54) TECHNOLOGIES FOR INTERFACING AN INPUT OVERLAY DEVICE WITH A TOUCH SCREEN COMPUTE DEVICE

(71) Applicant: Intel Corporation, Santa Clara, CA (US)

(72) Inventors: Arvind Kumar, Beaverton, OR (US); Antonio Cheng, Portland, OR (US); Scott Webb, Roseville, CA (US); Gustavo Fricke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 16/144,402

(22) Filed: Sep. 27, 2018

(65) Prior Publication Data

US 2019/0042040 A1 Feb. 7, 2019

(51) Int. Cl.
*G06F 3/044* (2006.01)
*G06F 3/039* (2013.01)
*G06F 3/041* (2006.01)
*G06F 3/0354* (2013.01)
*G06F 3/0488* (2013.01)

(52) U.S. Cl.
CPC .......... *G06F 3/039* (2013.01); *G06F 3/03547* (2013.01); *G06F 3/0412* (2013.01); *G06F 3/04886* (2013.01); *G06F 2203/04809* (2013.01)

(58) Field of Classification Search
CPC . G09B 21/008; G06F 3/0416; G06F 3/04886; G06F 3/0414; G06F 3/039; G06F 3/044; G07F 7/0886
USPC ............... 345/168, 174; 400/491; 235/381
See application file for complete search history.

(56) References Cited

U.S. PATENT DOCUMENTS

| 6,910,627 | B1 * | 6/2005 | Simpson-Young ............ G07F 7/0886 235/381 |
| 8,206,047 | B1 | 6/2012 | Isaac et al. |
| 8,790,025 | B2 | 7/2014 | Isaac et al. |
| 9,317,202 | B2 | 4/2016 | Isaac et al. |
| D772,862 | S | 11/2016 | Kwong et al. |
| 9,540,134 | B2 | 1/2017 | Melmon et al. |
| 9,758,274 | B2 | 9/2017 | Melmon et al. |
| 9,965,116 | B1 * | 5/2018 | Wolter ............... G09B 21/008 |
| 2012/0328349 | A1 * | 12/2012 | Isaac ................. G06F 3/04886 400/491 |
| 2015/0070281 | A1 * | 3/2015 | Melmon ............... G06F 3/039 345/168 |

(Continued)

OTHER PUBLICATIONS

Touchfire.com, https://touchfire.com/, accessed Jun. 17, 2018.
Sensel.com, https://sensel.com/, accessed Sep. 26, 2018.

*Primary Examiner* — Abdul-Samad A Adediran
(74) *Attorney, Agent, or Firm* — Hanley, Flight & Zimmerman, LLC

(57) ABSTRACT

Technologies for interfacing an input overlay device with a touch screen display of a compute device are disclosed. A compute device may detect that an input overlay device has been placed on top of its touch screen display. After detecting the input overlay device, the computing device determines one or more parameters for the input overlay device. The computing device may then detect an additional touch on the portion of the touch screen display currently covered by the input overlay device. The compute device can then determine an input of a user based on the position of the touch and the one or more parameters of the input overlay device.

25 Claims, 8 Drawing Sheets

(56) References Cited

U.S. PATENT DOCUMENTS

2015/0378492 A1* 12/2015 Rosenberg ............ G06F 3/0414
                                                    345/174
2017/0123552 A1*  5/2017 Brunet .................. G06F 3/0416
2017/0255320 A1   9/2017 Kumar et al.

* cited by examiner

TECHNOLOGIES FOR INTERFACING AN INPUT OVERLAY DEVICE WITH A TOUCH SCREEN COMPUTE DEVICE

BACKGROUND

Computing devices with touch screens give users the flexibility of working without a traditional keyboard. These touch screen computing devices may provide users with a "soft touch" keyboard displayed on the touch screen. A "soft touch" keyboard allows the user to provide input on the touch screen using the familiar layout of a keyboard.

While "soft touch" keyboards may provide a convenient way to input text, they may not be practical for long term use in some situations. "Soft touch" keyboards lack the physical characteristics that make traditional keyboards so appealing. For example, traditional keyboards can provide users with the satisfying feeling of pressing a key, haptic feedback, raised features, and the ability to rest their fingers on keys. These physical characteristics can allow for an increased typing speed and a more pleasurable typing experience.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
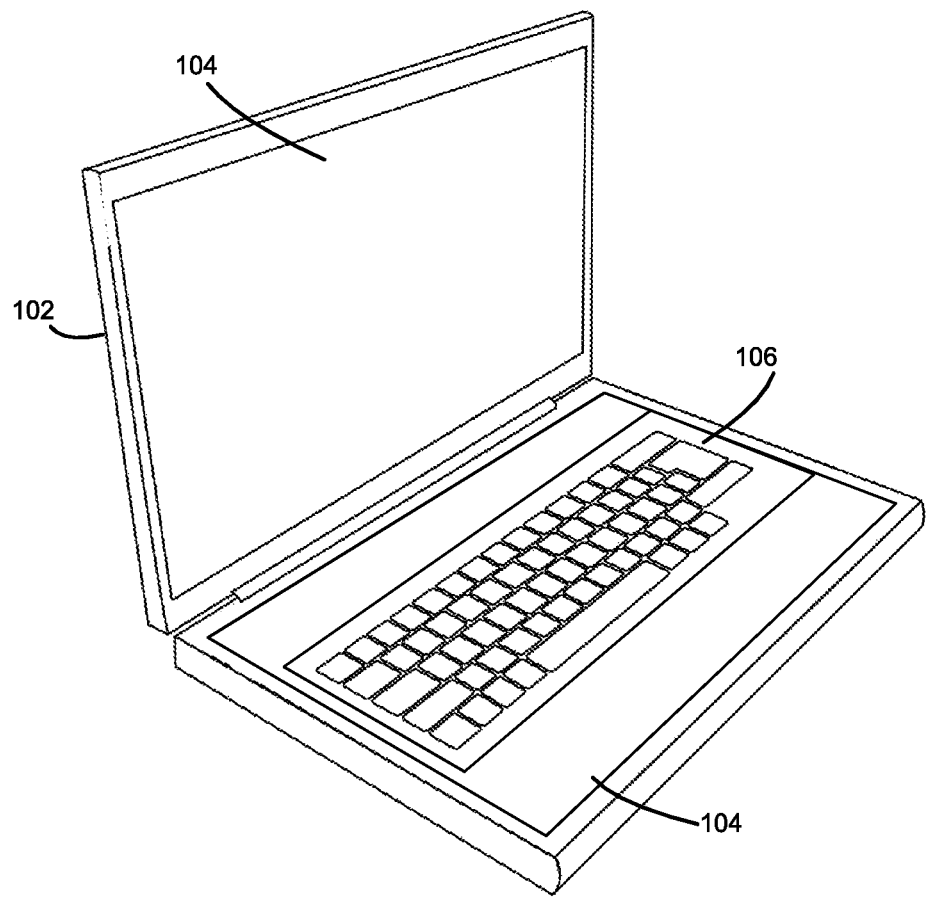
FIG. 1 is a simplified diagram of an input overlay device integrated with a compute device having a touch screen display.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 102 includes a touch screen display 104 and an input overlay device 106. The input overlay device 106 may be placed in any position on one of the touch screen displays 104 to facilitate data entry into the compute device 102. In response, the compute device 102 detects that the input overlay device 106 has been placed on the corresponding touch screen display 104, as well as the particular position and orientation of the input overlay device 106 on the touch screen display 104. The compute device 102 subsequently modifies the touch screen display 104 based on the input overlay device 106. For example, the input overlay device 106 may be embodied as a QWERTY keyboard, and the compute device 102 may display on the touch screen display 104 "soft" keys corresponding to the position of the keys of the input overlay device 106. A user may then interact with the input overlay device 106 in a similar manner as a traditional keyboard, such as by pressing down on keys. When a key makes contact with the touch screen display 104, the compute device 102 detects the touch and interprets it as a press of the corresponding key. The input overlay device 106 may be configured with similar keys as a traditional keyboard and interface with the compute device 102 in order to provide the user with a more traditional typing experience.

Figure 2:
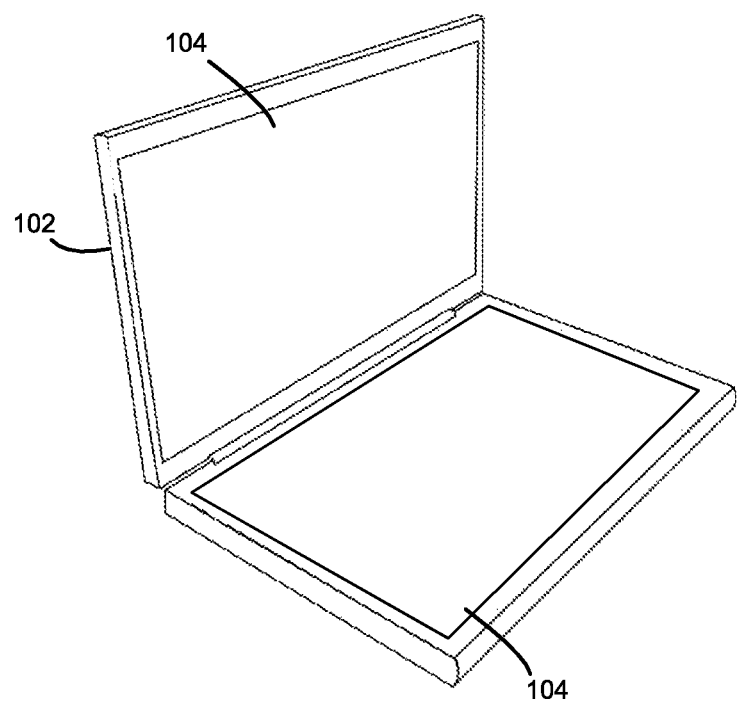
FIG. 2 is a simplified diagram of the compute device of FIG. 1 without the input overlay device.

It should be appreciated that the input overlay device 106 may be applied to and removed from the touch screen display 104 of the compute device 102. For example, as shown in FIG. 2, the input overlay device 106 has been removed from compute device 102. In this embodiment, without the input overlay device 106, the touch screen display 104 will operate as a standard touch screen display, such as by showing text, graphics, buttons, etc. In some embodiments, the compute device 102 may have a storage compartment to store the input overlay device 106 inside the compute device 102 when the input overlay device 106 has been removed from the touch screen display 104.

Figure 3:
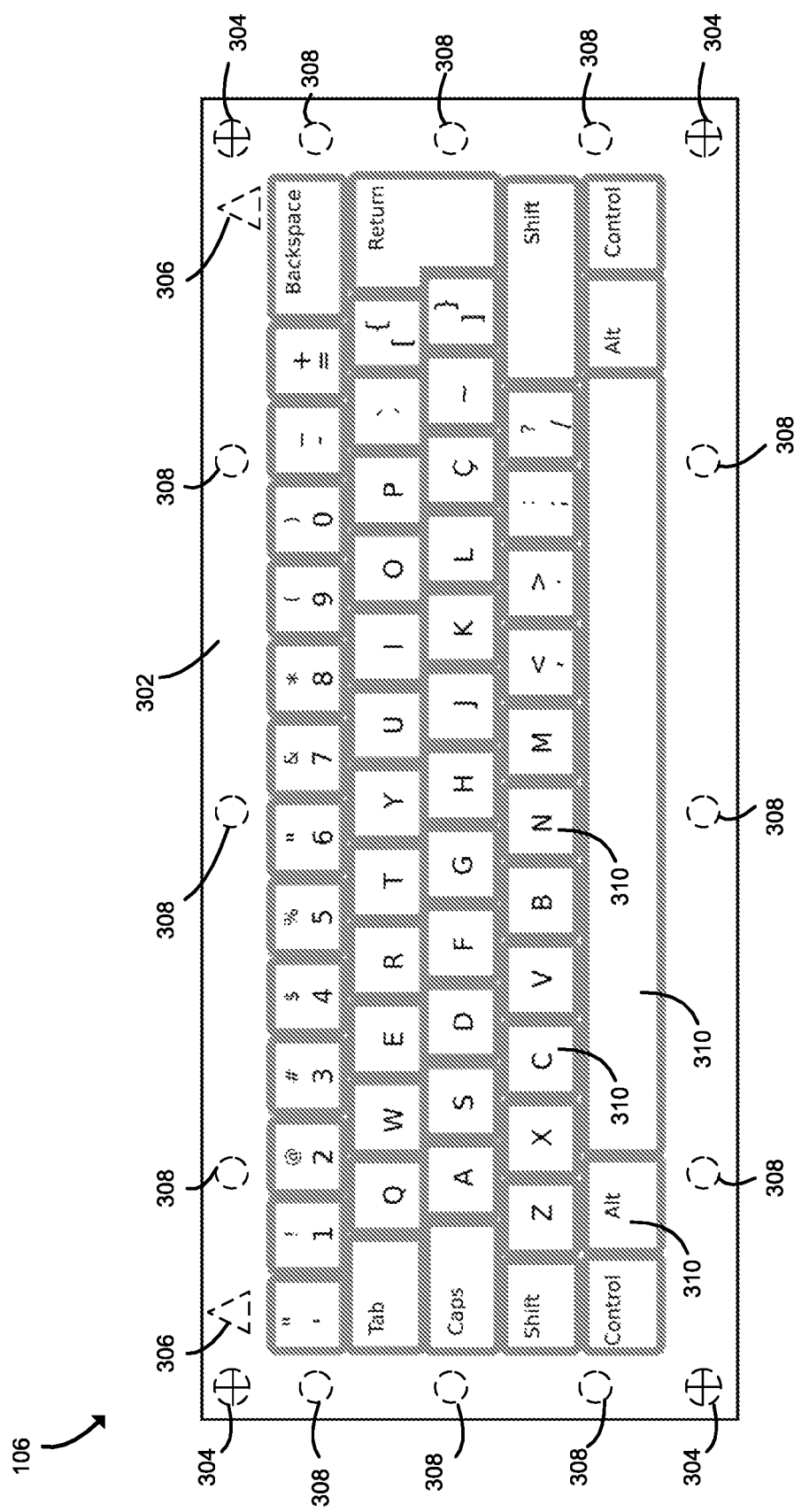
FIG. 3 is a simplified diagram of the topside of the input overlay device of FIG. 1.
Figure 4:
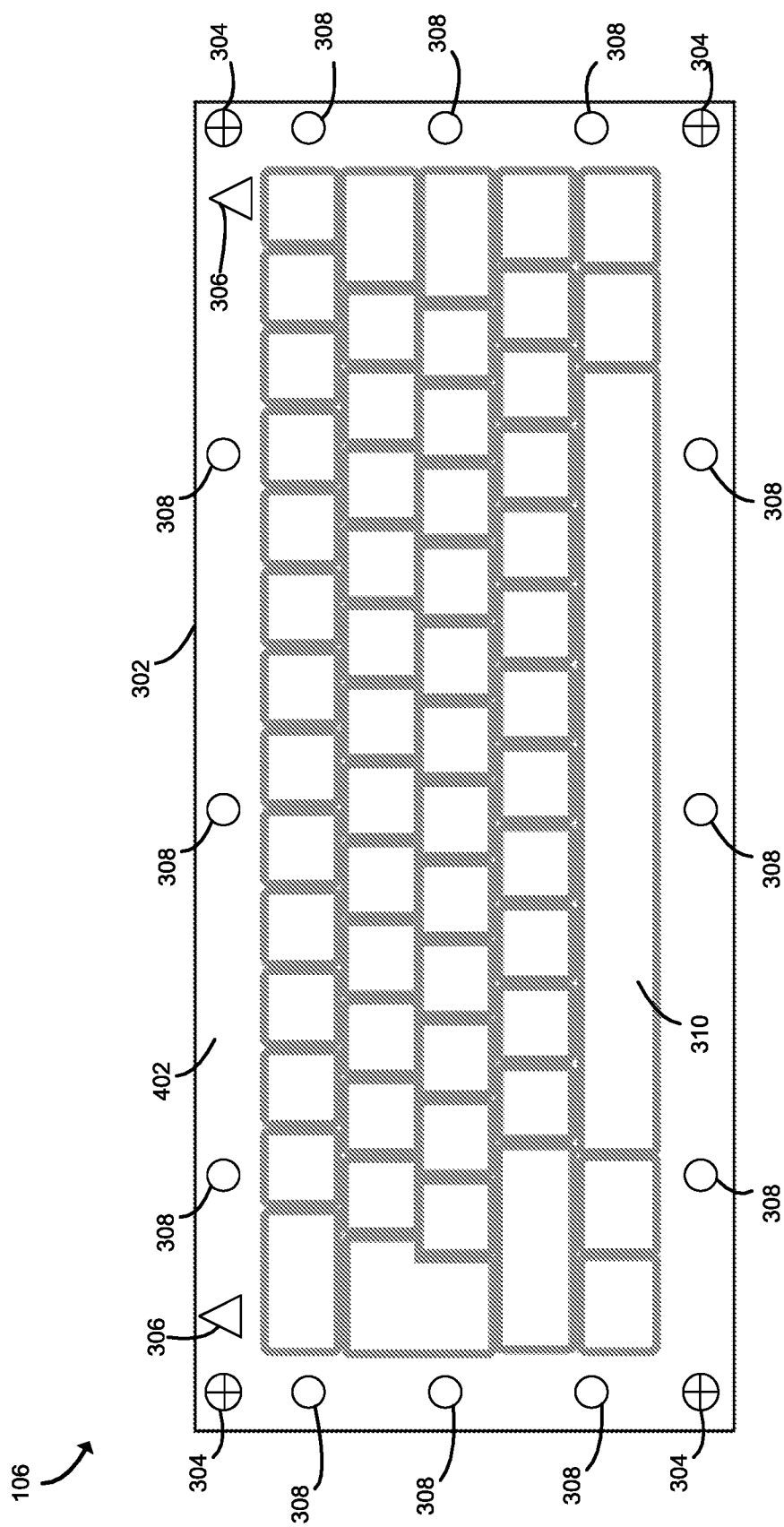
FIG. 4 is a simplified diagram of the underside of the input overlay device of FIG. 1.

Referring now to FIGS. 3 & 4, an illustrative embodiment of the topside and bottom side of the input overlay device 106 is shown in FIG. 3 and FIG. 4, respectively. The illustrative input overlay device 106 includes a base 302. The bottom side 402 (see FIG. 4) of the base 302 includes several index dots 304, two top edge markers 306, several marker dots 308, and several push buttons 310. In the illustrative embodiment, the base 302 and the various dots 304, 308 and markers 306 are made of a flexible material, such as rubber, silicone, or flexible plastic. However, in some embodiments, the base 302 is made of a rigid material, such as a hard plastic, metal, etc. For example, the base 302 may be made from polyethylene terephthalate. In the illustrative embodiment, the base 302 is transparent or semi-transparent, such that the touch screen display 104 is visible through the base 302. However, in some embodiments, some or all of the base 302 may be opaque, transparent, semi-transparent, or translucent. Additionally, in some embodiments, the base 302 may include additional support structure to support the base 302 on the touch screen display 104. Such support structure may be non-conductive so as to not trigger a touch on the touch screen display 104. In some embodiments, the input overlay device 106 may have one or more blank slots, exposing some portion of the touch screen display 104. The exposed portion of the touch screen display 104 can easily display content related to the input overlay device 106, such as displaying the current volume level in a media player or a digit display in a calculator.

Each of the index dots 304, the top edge markers 306, and the marker dots 308 may be embodied as any material capable of indicating a contact or "touch" on the touch screen display 104 and fulfilling the functions described herein, such as metal, conductive rubber, conductive foam, etc. The illustrative index dots 304, the top edge markers 306, and the marker dots 308 are located on the underside of the base 302 of the input overlay device 106. When the input overlay device 106 is placed on the touch screen display 104, the index dots 304, the top edge markers 306, and the marker dots 308 are in contact with the touch screen display 104 in a way that triggers a touch on the touch screen display 104 for each dot or marker. In some embodiments, some or all of the index dots 304, the top edge markers 306, and the marker dots 308 may also be placed on the topside of the base 302 of the input overlay device 106 in order to provide the user with a reference point on where the various markers are located. In some embodiments, the base 302 of the input overlay device 106 may be transparent or semi-transparent, as discussed above, and the index dots 304 placed on the underside of the input overlay device 106 may be visible on the topside of the input overlay device 106.

The index dots 304 indicate to the compute device 102 that the input overlay device 106 has been placed on one of its touch screen displays 104 as well as the location, orientation, and/or size of the touch screen display 104. For example, in some embodiments, the index dots 304 may indicate to the compute device 102 the area of the touch screen display 104 to be used by the input overlay device 106. In the illustrative embodiment, the input overlay device 106 includes four index dots 304, with one located in each of the four corners of the input overlay device 106. Additionally or alternatively, in some embodiments, the index dots 304 may be placed in different locations of the input overlay device 106, such as only in two corners or in one or more other locations on the input overlay device 106. In some embodiments, the compute device 102 may recognize the index dots 304 based on their location and/or on the shape of the index dots 304.

The illustrative top edge markers 306 indicate to the compute device 102 which edge of the input overlay device 106 is the top or upper edge. In the illustrative embodiment, the input overlay device 106 includes two top edge marker dotes 306 located on the top edge of the input overlay device 106. As such, in some embodiments, the compute device 102 may recognize the top edge markers 306 based on their location and/or shape.

The illustrative marker dots 308 indicate to the compute device 102 various input overlay parameters of the input overlay device 106, such as the input overlay device type, the input overlay device manufacture, the area used by the input overlay device 106, and/or other parameters of the input overlay device 106. To do so, the input overlay device 106 may indicate the various input overlay parameters to the compute device 102 using various combinations of marker dots 308. For example, in some embodiments, the input overlay device may include up to 8 marker dots 308 on each of the four edges of the input overlay device 106, and the compute device 102 may interpret each marker dot 308 as a bit. As such, the configuration of the marker dots 308 may indicate input overlay device parameters by encoding the input overlay device parameters in the bit pattern represented by the marker dots 308. Additionally or alternatively, the configuration of the marker dots 308 may indicate input overlay device parameters stored in another location, such as by indicating a product ID, which can be used to look up the associated input overlay device parameters. In some embodiments, a certain portion of the base 302 may be reserved for marker dots 308 that indicate specific parameters such as Vender ID or input overlay device type.

It should be appreciated that, in some embodiments, the input overlay device 106 may not include each of the index dots 304, the top edge markers 306, and the marker dots 308 and/or some of the index dots 304, the top edge markers 306, and the marker dots 308 may be embodied as more than one type of marker or dot. For example, the index dots 304 may be embodied as top edge marker dots 306, and mark both the location of the top edge of the input overlay device 106 and the overall location and orientation of the input overlay device 106.

Additionally, in some embodiments, the input overlay device 106 may include a component to attach the input overlay device 106 to the touch screen display 104 and/or the compute device 102. For example, the input overlay device 106 may include one or more suction cups that attach to the touch screen display 104. Additionally or alternatively, the input overlay device 106 may be permanently or removably attached to the compute device 102 and may be flipped into and out of position as an overlay. For example, the input overlay device 106 may be fixed to one edge of the compute device 102, and may be flipped to one position in which the input overly device 106 acts as a cover for the compute device 102, such as when the compute device 102 is closed (i.e., the two touch screen displays 104 are touching or nearly touching each other). When the compute device 102 is opened, the input overly device 106 or "cover" may be flipped onto an underside of the compute device 102 or may be flipped onto a touch screen display 104 and act as an overlay.

The push buttons 310 may be embodied as any type of push button capable of having a material located on the underside of each push button that triggers a touch on the touch screen display 104 when the corresponding push button is depressed onto the corresponding touch screen display 104 and otherwise capable of fulfilling the functions described herein. For example, each push button 310 may include a conductive nub or protuberance attached to an underside of the corresponding push button 310 and configured to contact the touch screen display 104 when the push button 310 is sufficiently depressed. In the illustrative embodiment, the push buttons 310 may be made of any suitable material, such as plastic, rubber, metal, etc., as long as there is conductive patch from the top of the push button 310 to a conductive nub that may come into contact with the touch screen display 104. In the illustrative embodiment, the push buttons 310 are a rigid material that may have a small spacing between the push buttons 310, similar to a traditional keyboard.

When a user places the input overlay device 106 on the touch screen display 104, the index dots 304, the top edge markers 306, and the marker dots 308 come into contact with the touch screen display 104. As the various dots 304, 308 and markers 306 come into contact with the touch screen display 104, the contact triggers a touch on the touch screen display 104 for each dot 304, 308 or marker 306. When the user first places the input overlay device 106 on the touch screen display 104, the push buttons 310 are positioned above the touch screen display 104 and are not in contact with the touch screen display 104. Each illustrative push button 310 is configured to move, upon application of force, from a position above the touch screen display 104 to a position where the push button 310 is in contact with the touch screen display 104 such that the touch screen display 104 senses a touch event. The push buttons 310 may have a springing mechanism to keep the push buttons 108 in the position above the touch screen display 104 absent application of an external force. For example, a user may press a push button 310 with their finger to cause the push button 310 to contact the touch screen display 104. When the user releases his finger from the push button 310, the springing mechanism causes push button 310 to return to the position above the touch screen display 104. The springing mechanism may be any suitable structure capable of performing the function described herein, such as a metal spring or other deformable material that naturally rebounds to its original shape. It should be appreciated that, in some embodiments, such as ones in which the touch screen display 104 is a capacitive sensor, the push button 310 may require some kind of electrical interaction with the touch screen display 104 in order to trigger a touch event. In such embodiments, the push button 310 may be configured to trigger a touch event on the touch screen display 104 in any suitable manner, such as by having a capacitive or conductive element contact the touch screen display 104. In some embodiments, the push buttons 310 may have a conductive element between a top side of the push button 310 that may be in contact with a user's finger and a bottom side of the push button 310 that contacts the touch screen display 104, thereby coupling the capacitance of the user's finger to the touch screen display 104. For example, in some embodiments, the push buttons 310 may include one or more holes filled with metal, such as holes of a size 50-200 micrometers filled with balls of solder. However, it should be appreciated that, in the illustrative embodiment, the input overlay device 106 need not have any active or powered electronics present, such as a battery, voltage source, or other power supply.

In some embodiments, the one or more push buttons 310 may have a label on the top indicating to the user the input of each push button 310. For example, in the illustrative embodiment, the push buttons 310 may be arranged in the form of a QWERTY keyboard. In other embodiments, the one or more push buttons 310 may be arranged in various configurations, such as the form of a piano keyboard or calculator. However, in some embodiments, the push buttons 310 are customizable.

Figure 5:
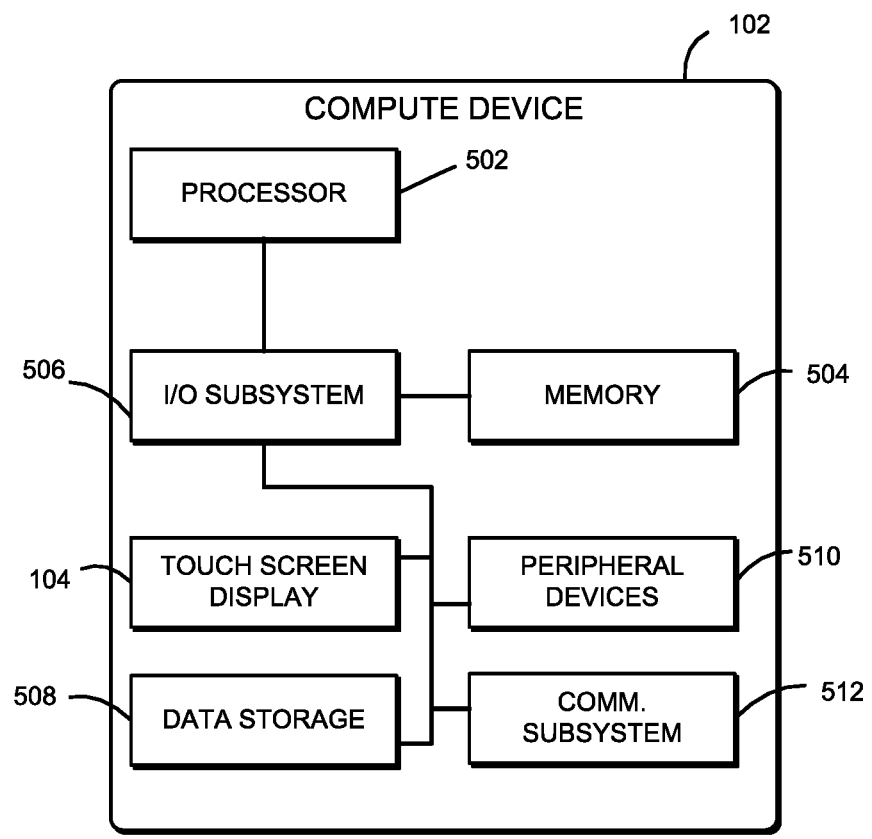
FIG. 5 is a simplified block diagram of at least one embodiment of a compute device of FIG. 1 for integrating with the input overlay device.

Referring now to FIG. 5, the compute device 102 may be embodied as any type of compute device capable of interfacing with an input overlay device 106 through a touch screen display 104 and performing the functions described herein. For example, the compute device 102 may be embodied as or otherwise be included in, without limitation, a tablet computer, a notebook computer, a laptop computer, an embedded computing system, a server computer, a System-on-a-Chip (SoC), a multiprocessor system, a processor-based system, a consumer electronic device, a smartphone, a cellular phone, a desktop computer, a network device, a networked computer, a wearable computer, a handset, a messaging device, a camera device, and/or any other computing device. The illustrative compute device 102 includes the processor 502, a memory 504, an input/output (I/O) subsystem 506, a data storage 508, a touch screen display 104, one or more peripheral devices 510, and a communication system 512. In some embodiments, one or more of the illustrative components of the compute device 102 may be incorporated in, or otherwise form a portion of, another component. For example, the memory 504, or portions thereof, may be incorporated in the processor 502 in some embodiments.

The processor 502 may be embodied as any type of processor capable of performing the functions described herein. For example, the processor 502 may be embodied as a single or multi-core processor(s), a single or multi-socket processor, a digital signal processor, a graphics processor, a microcontroller, or other processor or processing/controlling circuit. Similarly, the memory 504 may be embodied as any type of volatile or non-volatile memory or data storage capable of performing the functions described herein. In operation, the memory 504 may store various data and software used during operation of the compute device 102 such as operating systems, applications, programs, libraries, and drivers. The memory 504 is communicatively coupled to the processor 502 via the I/O subsystem 506, which may be embodied as circuitry and/or components to facilitate input/output operations with the processor 502, the memory 504, and other components of the compute device 102. For example, the I/O subsystem 506 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 506 may form a portion of a system-on-a-chip (SoC) and be incorporated, along with the processor 502, the memory 504, and other components of the compute device 102 on a single integrated circuit chip.

Additionally, compute device 102 may include one or more touch screen displays 104. The touch screen display(s) 104 may be embodied as any type of touch screen display capable of generating input data in response to being touched by the user of the compute device 102 and on which information may be displayed to a user of the compute device 102. The touch screen display 104 may be embodied as, for example, a resistive touch screen, a capacitive touch screen, or a camera-based touch screen. The touch screen display 104 may also be embodied as, for example, a liquid crystal display (LCD), a light emitting diode (LED) display, a cathode ray tube (CRT) display, a plasma display, an image projector (e.g., 2D or 3D), a laser projector, a heads-up display, and/or other display technology. In the illustrative embodiment, the touch screen display 104 may be capable of detecting two or more touches at different locations at the same time. In some embodiments, the touch screen display 104 may be capable of detecting an object that is hovering over the touch screen display 104 but not touching it. For example, when a user places her/his fingers on the push buttons 310, the touch screen display 104 may sense the presence of the fingers.

The data storage 508 may be embodied as any type of device or devices configured for the short-term or long-term storage of data. For example, the data storage 508 may include any one or more memory devices and circuits, memory cards, hard disk drives, solid-state drives, or other data storage devices.

The compute device 102 may further include one or more peripheral devices 510. The peripheral devices 510 may include any number of additional input/output devices, interface devices, and/or other peripheral devices. For example, in some embodiments, the peripheral devices 510 may include graphics circuitry, a graphical processing unit (GPU) and/or processor graphics, an audio device, a microphone, a camera, a keyboard, a mouse, a network interface, and/or other input/output devices, interface devices, and/or peripheral devices.

The compute device 102 also may include the communication subsystem 512, which may be embodied as any communication circuit, device, or collection thereof, capable of enabling communications between the compute device 102 and remote devices over a network. For example, the communication subsystem 512 may be embodied as or otherwise include a network interface controller (NIC) for sending and/or receiving network data with remote devices. The communication subsystem 512 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

Figure 6:
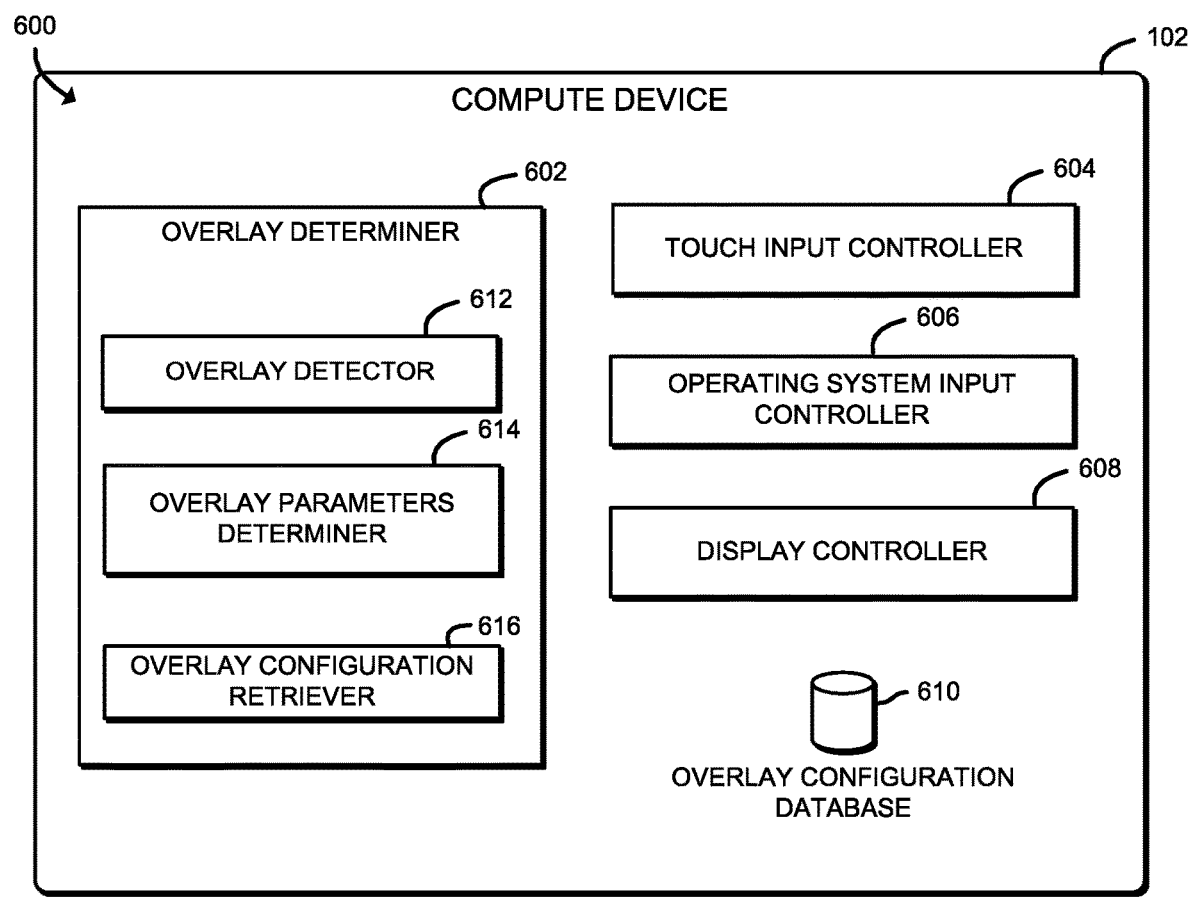
FIG. 6 is a block diagram of at least one embodiment of an environment that may be established by the compute device of FIGS. 1 and 5.

Referring now to FIG. 6, in an illustrative embodiment, the compute device 102 establishes an environment 600 during operation. The illustrative environment 600 includes an overlay determiner 602, touch input controller 604, an operating system input controller 606, a display controller 608, and an overlay configuration database 610. The various components of the environment 600 may be embodied as hardware, software, firmware, or a combination thereof. For example, the various components of the environment 600 may form a portion of, or otherwise be established by, the processor 502 or other hardware components of the compute device 102. As such, in some embodiments, one or more of the components of the environment 600 may be embodied as circuitry or collection of electrical devices (e.g., overlay determiner circuitry 602, touch input controller circuitry 604, etc.). It should be appreciated that, in such embodiments, one or more of the circuits (e.g., the overlay determiner circuitry 602, the touch input controller circuitry 604, etc.) may form a portion of one or more of the processor 502, the memory 504, the I/O subsystem 506, the communication subsystem 512, the data storage 508, an application specific integrated circuit (ASIC), a programmable circuit such as a field-programmable gate array (FPGA), and/or other components of the compute device 102. For example, the device touch input controller circuitry 612 may be embodied as the processor 502 and associated instructions stored on the data storage 508 and/or the memory 504, which may be executed by the processor 502. Additionally, in some embodiments, one or more of the illustrative components may form a portion of another component and/or one or more of the illustrative components may be independent of one another. Further, in some embodiments, one or more of the components of the environment 600 may be embodied as virtualized hardware components or emulated architecture, which may be established and maintained by the processor 502 or other components of the compute device 102. It should be appreciated that some of the functionality of one or more of the components of the environment 600 may require a hardware implementation, in which case embodiments of components which implement such functionality will be embodied at least partially as hardware.

The overlay determiner 602, which may be embodied as hardware, firmware, software, virtualized hardware, emulated architecture, and/or a combination thereof as discussed above, is configured to determine if the input overlay device 106 is present and determine the parameters of the input overlay device 106 in response to the determination that the input overlay device 106 being present. The overlay determiner 602 includes an overlay detector 612, an overlay parameters determiner 614, and an overlay configuration retriever 616.

The overlay detector 612 is configured to detect if the input overlay device 106 has been placed on the touch screen display 104. The overlay detector 612 may detect the input overlay device 106 by locating at least one index dot 304 of the input overlay device 106. In some embodiments, the overlay detector 612 may detect the input overlay device 106 based on the number of index dots 304 and the location of the index dots 304 relative to each other. For example, the overlay detector 612 may determine if an input overlay device 106 has been placed on a touch screen display 104 when four touches are detected that form a 12 inch by 4 inch rectangle. In some embodiments, the overlay detector 612 may determine if an input overlay device 106 has been placed on the touch screen display 104 based on the shape of the of the touches. It should be appreciated that, because the position and orientation of the input overlay device 106 can be detected and compensated for, the input overlay device 106 does not need to be precisely positioned and oriented on the display. Additionally, the input overlay device 106 may be placed on touch screen displays 104 of various sizes, as long as some or all of input overlay device 106 is on the touch screen display 104.

The overlay parameters determiner 614 is configured to determine the overlay parameters of the input overlay device 106. The overlay parameter determiner 606 may determine the overlay parameters of the input overlay device 106 using the configuration of the marker dots 308 and the top edge markers 306. In some embodiments, the marker dots 308 may indicate input overlay device parameters by encoding the input overlay device parameters in the bit pattern represented by the marker dots 308. Additionally or alternatively, the marker dots 308 may indicate particular input overlay device parameters that are stored in another location, such as by indicating a product ID, which can be used to look up the associated input overlay device parameters. For example, in one embodiment, there may be 32 possible marker dots 308, and the presence of a marker dot 308 in a particular position can represent a "1" and the absence of a marker dot 308 can represent a "0." The 32-bit string that the marker dots 308 represent can be used to look up input overlay device parameters in the overlay configuration database 612.

The overlay parameters of the input overlay device 106 may include at least the input overlay device type, the orientation of the input overlay device 106, the key mapping data, the area of the touch screen display 104 to be used by the input overlay device 106, etc. Key mapping data may include a table that defines a boundary for each push button 310 relative to a part of the input overlay device 106, such as relative to one of the index dots 304. For example, in one embodiment, one index dot 304 (e.g., the upper left index dot 304) may be defined as the (0, 0) coordinate and is treated as the origin of the coordinate system. The x-direction may increase positively towards the right side, and the y-direction may increase positively towards the downward direction. The scale is fixed by the input overlay parameters, such that coordinates are relative to the input overlay device 106 and can be scaled to match the resolution of the touch screen display 104. The horizontal and vertical scales may use some arbitrary unit to define the coordinate system, such as a scale for the x-direction that goes from 0 to 1000 and a scale for the y-direction that goes from 0 to 100. In this coordinate system, the (1000, 100) point may be the bottom right index dot 304. When the touch screen display 104 detects the touch coordinates for the index dots 304, the compute device 102 can map the location of the index dots 304 on the touch screen display 104 to the coordinates of the index dots 304 relative to the input overlay device 106, creating a simple scaling system that may be used while the input overlay device 106 is on the touch screen display 104. In some embodiments, the key mapping data is customizable by the user.

The key mapping data may specify how a particular push button 310 is labeled or a particular function that is expected to be associated with the push button 310. For example, the input overlay device 106 may be embodied as a QWERTY keyboard, and the key mapping data may indicate which letter or symbol each push button 310 is labeled with. In another example, the input overlay device 106 may be embodied as a media player interface, and the key mapping data may indicate a particular function associated with each push button 310, such as pause, play, fast-forward, etc. In some embodiments, the input overlay device parameters may indicate that input from certain portions of the touch screen display 104 should be ignored. For example, a user might rest his hands below the input overlay device 106 and in contact with the touch screen display 104, and the input overlay device parameters may indicate that such contact should be ignored. The input overlay device parameters may also define a portion of the touch screen display 104 that can be used for a particular function, such as functioning similar to a touchpad input on a laptop for controlling the position of a cursor. Additionally or alternatively, the input overlay parameters may define a portion of the touch screen display 104 that can be used as input for performing action with a cursor, similar to buttons on a mouse. It should be appreciated that, in some embodiments, the portion of the touch screen display 104 that the input overlay device parameters indicate should be ignored may extend beyond the portion of the touch screen display 104 that is covered by the input overlay device 106.

Once the input overlay device 106 has been identified, the compute device 102 may load or access certain software modules or drivers. For example, the overlay detector 602 may detect a QWERTY keyboard on the touch screen display 104, and the compute device 102 may load software to transform the touches on the touch screen display 104 to the equivalent of key presses of a keyboard.

The overlay configuration retriever 616 is configured to retrieve the overlay configuration data for the input overlay device 106 from the overlay configuration database 610. The overlay configuration data correlates each touch on the touch screen display 104 to an input of the input overlay device 106. The overlay configuration data retrieved for each input overlay device 106 may be based on the determined input overlay device type.

The touch input controller 604, which may be embodied as hardware, firmware, software, virtualized hardware, emulated architecture, and/or a combination thereof as discussed above, is configured to determine the intended touch input from a user. The touch input controller 604 may determine if a touch has been detected. The touch input controller 604 may then determine the location of the touch on the touch screen display 104. The touch input controller 604 may then analyze the location of the touch based on the input overlay device parameters of the input overlay device 106 to determine the intended input corresponding to the touch. In some embodiments, the touch input controller 604 may detect a touch located outside of the area defined by the input overlay device 106. The touch input controller 604 may then ignore the touch outside the defined area or perform a different action based on the touch being outside the defined area. In some embodiments, the touch input controller 604 may also detect an object that is hovering over the touch screen display 104 but not touching it. For example, when a user places his fingers on the push buttons 310, the touch input controller 604 may sense the presence of the fingers. Processing done by the touch input controller 604 may be done on the main processor of the compute device 102 and/or may be done on a dedicated component for interpreting such touch input.

The operating system input controller 606, which may be embodied as hardware, firmware, software, virtualized hardware, emulated architecture, and/or a combination thereof as discussed above, is configured in the illustrative embodiment to hide the area of the touch screen display 104 to be used by the input overlay device 106 from the operating system of the compute device 102. The operating system input controller 606 may translate the inputs from the input overlay device 106 from raw touch input to "clean" inputs for the operating system. For example, in some embodiments, the operating system input controller 606 will emulate the touch inputs as peripheral inputs, such as a USB keyboard. The operating system input controller 606 may, in some embodiments, remove the touch screen display 104 associated with the input overlay device 106 as an available display shown to the operating system and other software on the compute device 102. For example, in some embodiments, the touch screen display 104 associated with the input overlay device 106 may only be used only for input and may not be available for displaying, e.g., an application window. Of course, another display or touch screen display 104 that does not have an input overlay device 106 on it may still be used as a normal display. When the input overlay device 106 is removed from the touch screen display 104, the operating system input controller 606 is configured to expose the area of the touch screen display 104 used by the input overlay device 106 to the operating system of the compute device 102.

The display controller 608, which may be embodied as hardware, firmware, software, virtualized hardware, emulated architecture, and/or a combination thereof as discussed above, is configured to control the images displayed on the touch screen display 104 that has on it a input overlay device 106. The display controller 608 may generate images to be displayed based on the overlay configuration data and keyboard mapping data. In some embodiments, the input overlay device 106 may be a QWERTY keyboard and the display controller 608 may generate an image of a QWERTY keyboard to be displayed under the input overlay device 106. Additionally or alternatively, the display controller 608 may modify the image displayed on the touch screen display 104 based on the input of the user. In some embodiments, the display controller 608 may light up the area under a push button 310 when the pushed button 310 is pushed down to be in contact with the touch screen display 104. In some embodiments, the display controller 608 may highlight an area designated for, e.g., num lock, caps lock, or scroll lock when the corresponding lock is active.

The overlay configuration database 610 includes data related to the overlay configuration for various types of input overlay devices 106. The overlay configuration data may include data related to the coordinate system used by the input overlay devices 106 of a particular type. The overlay configuration data may map the location of a touch to its indented input. In some embodiments, the input overlay device 106 is a QWERTY keyboard and the overlay configuration data correlates with the location of the touch with a keyboard input.

The overlay configuration database 610 stores configuration data for at least one input overlay device 106. The overlay configuration database 610 may receive configuration data from any suitable source, such as downloading it from the Internet or copying it from media provided by a user.

Figure 7:
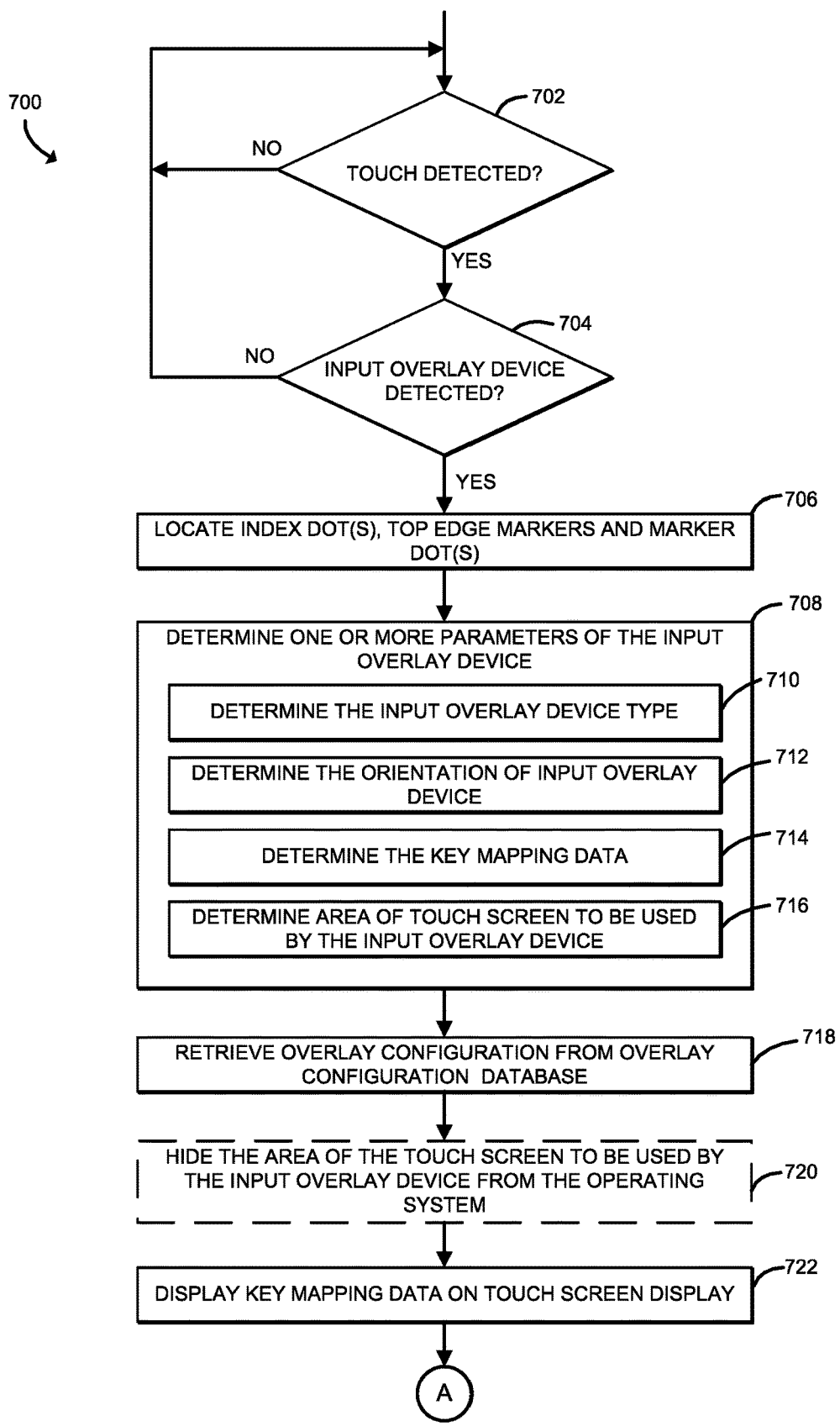
FIGS. 7-8 are a simplified flow diagram of at least one embodiment of a method for integrating the input overlay device of FIG. 1 with the compute device of FIG. 1 that may be executed by the compute device of FIG. 1.

Referring now to FIG. 7, in use, the compute device 102 may execute a method 700 for interfacing with an input overlay device 106. The method 700 begins in block 702, in which the compute device 102 determines if a touch has been detected on the touch screen display 104 of the compute device 102. If no touch has been detected, the method 700 moves back to block 702 and continues monitoring for a touch. If a touch has been detected, the method 700 advances to block 704. In block 704, the compute device 102 determines if an input overlay device 106 has been placed on the touch screen display 104. The compute device 102 may determine if an input overlay device 106 is present by determining if a specific arrangement of touches is present. In some embodiments, the compute device 102 may detect the input overlay device 106 based on the number of index dots 304 and the location of the index dots 304 relative to each other. For example, the compute device 102 may determine if an input overlay device 106 has been placed on a touch screen display 104 when four touches are detected that form a 12 inch by 4 inch rectangle. In some embodiments, the compute device 102 may determine if an input overlay device 106 has been placed on the touch screen display based on the shape of the of the touches. If the compute device 102 does not detect an input overlay device 106, the method 700 moves back to block 702. If the compute device 102 detects an input overlay device 106, then the method 700 advances to block 706.

In block 706, the compute device 102 locates the index dots 304, the top edge markers 306 and the marker dots 308. The compute device 102 may locate the dots 304, 308 and markers 306 at least partially based on which touches on the touch screen display 104 remain constant. In some embodiments, the compute device 102 may determine the type of dot/marker by the shape of the touch. Additionally or alternatively, in some embodiments, the compute device 102 may determine the type of dots 304, 308 and markers 306 by comparing the touch locations relative to each other and to a preset configuration. For example, a QWERTY keyboard may contain four index dots 304, two top edge marker 306 and up to 32 marker dots 308 in a rectangle configuration. The four index dots 304 may be detected by locating the four touches in the corners of the rectangle of touches. The two top edge markers 306 may be detected by locating the two touches immediately next to two of the index dots 304. The marker dots 308 may be detected by locating the dots along the edges of the rectangle of touches that are not the index dots 304 or the top edge markers 306. In some embodiments, the compute device 102 may load or access certain software modules based on the dot/markers located.

In block 708, the compute device 102 determines one or more parameters of the input overlay device 106. The compute device 102 may determine the one or more parameters using the located index dots 304, top edge markers 306, and/or marker dots 308. The determined parameters may describe the different attributes of the input overlay device 106.

In block 710, the compute device 102 determines the type of the input overlay device 106. The type of the input overlay device 106 may describe the function or layout of the input overlay device 106. For example, the input overlay device type may be a QWERTY keyboard or a piano. In some embodiment, the compute device 10 may determine the type of the input overlay device 106 may looking up information in a database based on a vender ID or product ID of the input overlay device 106 that is indicated by the configuration of marker dots 308. For example, the input overlay device 106 may have up to eight marker dots 308 along each of the four edges of the input overlay device 106. The presence or absence of the 32 marker dots 308 would allow for 2^32 different possible patterns of marker dots. A particular pattern of marker dots may indicate that the input overlay device 106 is, e.g., a QWERTY keyboard, a piano keyboard, or a calculator. In some embodiments, certain marker dots 308 may be reserved for particular parameters such as vendor ID.

In block 712, the compute device 102 may determine the orientation of the input overlay device 106. The compute device 102 may use the top edge marker dots 308 to determine which side of the input overlay device 106 will be considered the "top." In some embodiments, the orientation of the input overlay device 106 may also indicate the alignment of the input overlay device 106. It should be appreciated that the orientation need not be precise, and the compute device 102 may detect and correct for an orientation that is askew.

In block 714, the compute device 102 may determine the key mapping data. Key mapping data may indicate to the compute device 102 which push buttons 310 of the input overlay device 106 correspond to which input. For example, for a QWERTY keyboard, the key mapping data may indicate that the push button 310 in the top left corner indicates a """ input. In some embodiments, the key mapping data may designate push buttons 310 for a "touch pad" such as left and right click. In some embodiments, the key mapping data is customizable by the user.

In block 716, the compute device 102 may determine the area of the touch screen display 104 to be used by the input overlay device 106. The compute device 102 may determine the area based on the marker dots 308, the boundary made by the marker3 304, 308 and dots 306, the overlay configuration data, or any combination of the above. In some embodiments, the designated area may include a "touch pad" area. The "touch pad" area may correspond to a gap in the input overlay device 106, a thin layer of the input overlay device 106 or a designed area near the input overlay device 106.

In block 718, the compute device 102 may retrieve overlay configuration data from the overlay configuration database 610. The overlay configuration data may be retrieved based on the input overlay device type. The overlay configuration data may define the area used by the input overlay device 106. The overlay configuration data may include a table that defines a boundary for each push button 310 relative to part of the input overlay device 106, such as relative to one of the index dots 304. For example, in one embodiment, one index dot 304 (e.g., the upper left index dot 304) may be defined as the (0, 0) coordinate and is treated as the origin of the coordinate system. The x-direction may go positive towards the right side, and the y-direction goes positive towards the downward direction. The scale is fixed by the input overlay parameters, such that coordinates are relative to the input overlay device 106 and can be scaled to match the resolution of the touch screen display 104. The horizontal and vertical scales may use some arbitrary unit to define the coordinate system, such as a scale for the x-direction that goes from 0 to 1000 and a scale for the y-direction that goes from 0 to 100. In this coordinate system, the (1000, 100) point may be the bottom right index dot 304. When the touch coordinates for the index dots 304 are reported, the compute device 102 can map the location of the index dots 304 on the touch screen display 104 to the coordinates of the index dots 304 relative to the input overlay device 106, creating a simple scaling system that the compute device 102 may use while the input overlay device 106 is on the touch screen display 104. In some embodiments, the overlay configuration data is customizable by the user.

In block 720, the compute device 102 may hide from the operating system the area of the touch screen display 104 to be used by the input overlay device 106. After the area has been hidden, the operating system (OS) and/or applications of the compute device 102 will not have access to that area of the touch screen display 104. In some embodiments, the compute device 102 may notify the display driver of the touch screen display 104 that an input overlay device 106 is active, thereby letting the device driver remove the touch screen display 104 from the devices shown to the OS and/or applications and only allow specific components such as the touch input controller 604 to manage the lighting of the pixels of the corresponding area. In some embodiments, the compute device 102 may have two touch screen displays 104, and, when an input overlay device 106 is detected on one of the touch screen displays 104, the display driver is notified to remove that touch screen display 104 from the OS. This would allow the OS to move all the application and OS windows to the touch screen display 104 without the input overlay device 106, and no application content would be displayed on the touch screen display 104 with the input overlay device 106.

In block 722, the compute device 102 may display the key mapping data on the touch screen display 104. The compute device 102 may use the key mapping data along with the overlay configuration data and the orientation data to map the keys of the input overlay device 106 onto the touch screen display 104. For example, when the input overlay device 106 is a QWERTY keyboard, an image of a keyboard may be displayed under the input overlay device 106. In some embodiments, the input overlay device 106 is transparent and the user will be able to see the displayed key positions under the input overlay device 106. In some embodiments, a "touch pad" or "mouse pad" area may be displayed. In some embodiments, the input overlay device 106 may have exposed portions and the compute device may display content on the exposed portions. For example, the exposed portions may display current volume for a media player or results from a calculator.

Figure 8:
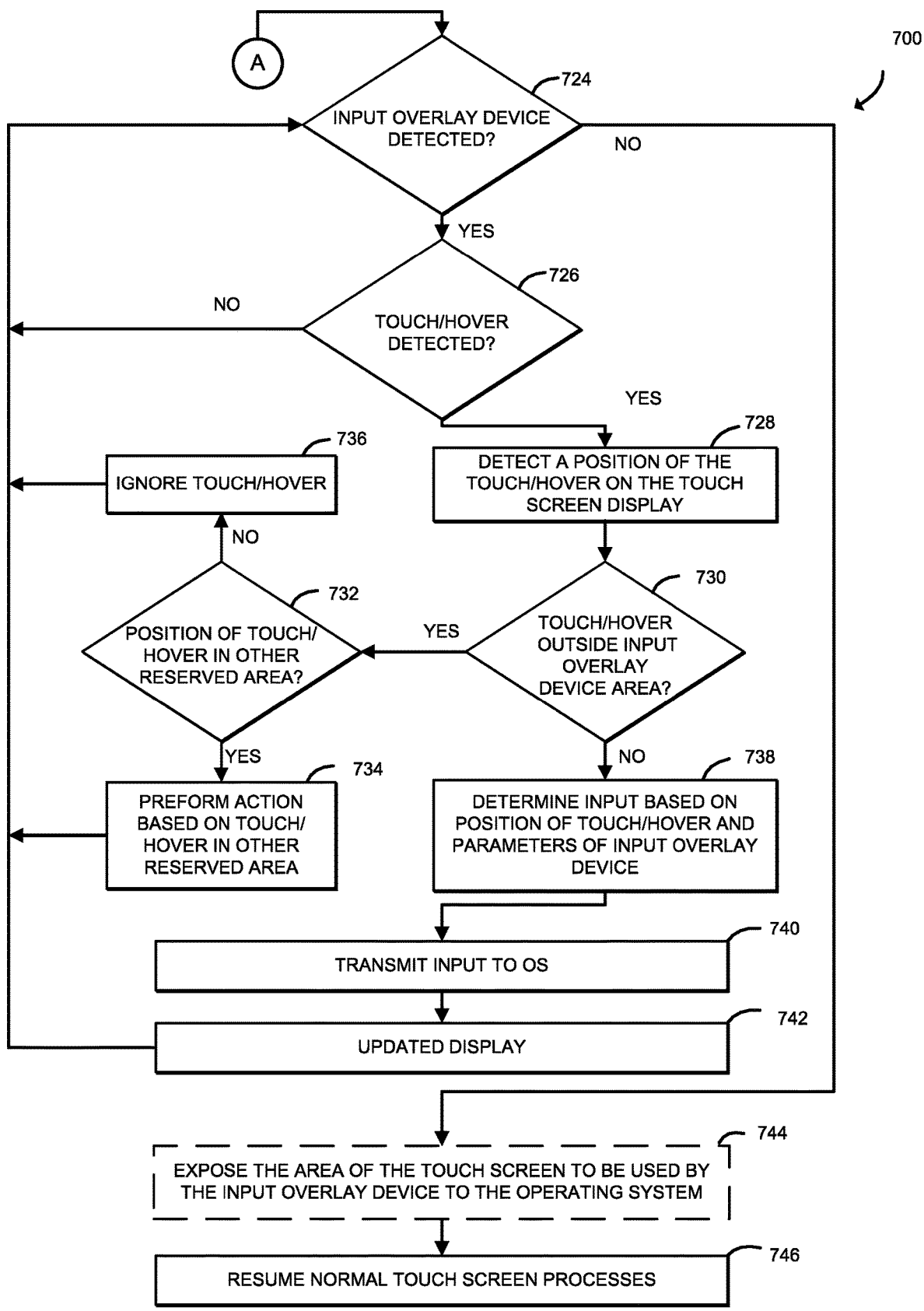

Referring now to FIG. 8, in block 724, the compute device 102 determines whether the input overlay device 106 is still on the touch screen display 104. The compute device 102 may determine if the input overlay device 106 is still in place by monitoring if the index dots 304, top edge marker 306, and markers dots 308 are still detected. When these dots 304, 308 and/or markers 306 are no longer detected, the compute device 102 may conclude that the input overlay device 106 has been removed from the touch screen display 104. If the compute device no longer detects the input overlay device 106, then the method 700 jumps to block 744, in which the compute device 102 may expose the area of the touch screen display 106 that was used by the input overlay device 106 to the operating system. If the compute device 102 continues to detect the input overlay device 106, then the method 700 advances to block 726.

In block 726, the compute device 102 determines whether a new touch (or hover) has been detected on the touch screen display 104. If the compute device 102 does not detect a new touch, the method 700 loops back to block 724 to again check if the input overlay device 106 is detected. If the compute device 102 does detect a new touch (or hover), then the method 700 advances to block 728.

In block 728, the compute device 102 determines the position of the touch on the touch screen display 104. In some embodiments, the compute device 102 determines the position of the hover on the touch screen display 104.

In block 730, the compute device 102 determines whether the touch is located outside the area reserved for the input overlay device 106. In some embodiments, the compute device 102 determines whether the hover is located outside the area reserved for the input overlay device 106. If the touch or hover is located inside the input overlay device 106 area, the method proceeds to block 738, in which an input is determined based on the touch. If the touch or hover is located outside the input overlay device area, the method 700 advances to block 732.

In block 732, the compute device determines whether the touch or hover is located in another reserved area. If the touch or hover is located in another reserved area, then the compute device 102 advances to block 734, in which the compute device 102 preforms an action based on the touch or hover in the reserved area, such as movement of a mouse or cursor. If the touch or hover is not located in another reserved area, then method 700 advances to block 736, in which the compute device 102 ignores the touch or hover and moves back to block 724.

Referring back to block 730, if the compute device 102 determines that the touch or hover is located in the area designated for the input overlay device 106, then the method 700 advances to block 738. In block 738, the compute device 102 determines the intended input based on the location of the touch or hover and the overlay configuration data. For example, the area that the input overlay device 106 covers may be divided into a grid based system. The compute device may determine the location of a touch in the grid and locate the corresponding key stroke based on the location in the grid. One location in the grid may correspond to, e.g., a key in a QWERTY keyboard.

In block 740, the compute device 102 may transmit the input (such as a key press on a QWERTY keyboard) to the operating system. If the area of the touch screen display 104 is hidden from the operating system of the compute device 102, then the raw touch input may be converted to a "clean" input for the operating system. In some embodiments, the "clean" input may appear as an input from a peripheral device such as an USB keyboard.

In block 742, the compute device 102 may update the touch screen display 104 based on the user input. In some embodiments, the compute device 102 may change the lighting under a key stroke when the corresponding push key is struck. The compute device 102 then advances back to block 724 and detects if the input overlay device 106 is still on to the touch screen display 104.

Referring back to block 724, if an input overlay device is not detected, the method proceeds to block 744. In block 744, the compute device 102 may expose to the operating system the area of the touch screen display 106 that the input overlay device 106 used. In block 746, the compute device 102 may continue normal operation of the touch screen display 104 without the input overlay device 106.

EXAMPLES

Illustrative examples of the devices, systems, and methods disclosed herein are provided below. An embodiment of the devices, systems, and methods may include any one or more, and any combination of, the examples described below.

Example 1 includes a compute device for interfacing with an input overlay device, the compute device comprising a touch screen display; overlay determiner circuitry to determine that the input overlay device has been placed on top of at least a portion of the touch screen display; and determine one or more parameters of the input overlay device; and touch input controller circuitry to detect a position of a touch on the portion of the touch screen display covered by the input overlay device; and determine an input based on the position of the touch and the one or more parameters of the input overlay device.

Example 2 includes the subject matter of Example 1, and wherein the touch input controller circuitry is further to detect a position of a hover on the portion of the touch screen display covered by the input overlay device.

Example 3 includes the subject matter of any of Examples 1 and 2, and wherein the overlay determiner circuitry is further to detect a position of one or more marker dots of the input overlay device in contact with the touch screen display, wherein the position of the one or more marker dots indicate the one or more parameters of the input overlay device.

Example 4 includes the subject matter of any of Examples 1-3, and wherein the compute device further comprises an overlay configuration database; and wherein the overlay determiner circuitry is further to retrieve overlay configuration data from the overlay configuration database based on the position of the one or more marker dots, wherein the overlay configuration data comprises the one or more parameters of the input overlay device.

Example 5 includes the subject matter of any of Examples 1-4, and wherein the overlay determiner circuitry is further to determine a position of the input overlay device on the touch screen display, wherein to determine an input based on the position of the touch and the one or more parameters of the input overlay device comprises to determine an input based on the position of the touch and the position of the input overlay device.

Example 6 includes the subject matter of any of Examples 1-5, and wherein the compute device further comprises display controller circuitry to display key mapping data on the one or more touch screen displays.

Example 7 includes the subject matter of any of Examples 1-6, and wherein the one or more parameters of the input overlay device comprises an area of the one or more touch screen displays to be used as a touchpad.

Example 8 includes the subject matter of any of Examples 1-7, and wherein the compute device further comprises an operating system and operating system input controller circuitry, wherein the operating system input controller is to hide an area of the touch screen to be used by the input overlay device from the operating system; and emulate the input as a peripheral input to the operating system.

Example 9 includes the subject matter of any of Examples 1-8, and wherein the one or more parameters of the input overlay device comprise an indication of an area of the touch screen display that should be ignored.

Example 10 includes the subject matter of any of Examples 1-9, and further including the input overlay device, wherein the input overlay device comprises a base comprising a top side and a bottom side, wherein the bottom side is to be placed on the touch screen display of the compute device; one or more index dots on the bottom side of the base, wherein the one or more index dots indicate to the compute device that the overlay has been placed on the touch screen display; and one or more push buttons configured to move, upon application of force, from a first position to a second position such that, when the input overlay device is placed on the touch screen display, the corresponding push button is in contact with the touch screen display in the second position and is not in contact with the touch screen display in the first position.

Example 11 includes an input overlay device for a compute device, the input overlay device comprising a base comprising a top side and a bottom side, wherein the bottom side is to be placed on a touch screen display of the compute device; one or more index dots on the bottom side of the base, wherein the one or more index dots indicate to the compute device that the overlay has been placed on the touch screen display; and one or more push buttons configured to move, upon application of force, from a first position to a second position such that, when the input overlay device is placed on the touch screen display, the corresponding push button is in contact with the touch screen display in the second position and is not in contact with the touch screen display in the first position.

Example 12 includes the subject matter of Example 11, and wherein the base and the one or more push buttons are transparent or semi-transparent and wherein at least a portion of each of the one or more push buttons is conductive such that a finger placed on the top of each push button is electrically coupled to the touch screen display when the push button is in the second position.

Example 13 includes the subject matter of any of Examples 11 and 12, and further including one or more marker dots, wherein a position of the one or more marker dots indicate one or more input overlay device parameters for the compute device to use to interpret touch input on the touch screen display.

Example 14 includes the subject matter of any of Examples 11-13, and wherein the type of the input overlay device is a QWERTY keyboard.

Example 15 includes the subject matter of any of Examples 11-14, and wherein each of the one or more push buttons comprises a capacitive or conductive element that is in contact with the touch screen display when the push button is in the second position.

Example 16 includes the subject matter of any of Examples 11-15, and further including one or more suction cups, wherein the one or more suction cups are configured to attach the input overlay device to the touch screen display.

Example 17 includes one or more computer-readable media comprising a plurality of instructions stored thereon that, when executed, causes a compute device to determine that an input overlay device has been placed on top of at least a portion of a touch screen display of the compute device; determine one or more parameters of the input overlay device; detect a position of a touch on the portion of the touch screen display covered by the input overlay device; and determine an input based on the position of the touch and the one or more parameters of the input overlay device.

Example 18 includes the subject matter of Example 17, and wherein the plurality of instructions further cause the compute device to detect a position of a hover on the portion of the touch screen display covered by the input overlay device.

Example 19 includes the subject matter of any of Examples 17 and 18, and wherein the plurality of instructions further cause the compute device to detect a position of one or more marker dots of the input overlay device in contact with the touch screen display, wherein the position of the one or more marker dots indicate the one or more parameters of the input overlay device.

Example 20 includes the subject matter of any of Examples 17-19, and wherein the plurality of instructions further cause the compute device to retrieve an overlay configuration data from an overlay configuration database based on the position of the one or more marker dots, wherein the overlay configuration data comprises the one or more parameters of the input overlay device.

Example 21 includes the subject matter of any of Examples 17-20, and wherein the plurality of instructions further cause the compute device to determine a position of the input overlay device on the touch screen display, wherein to determine an input based on the position of the touch and the one or more parameters of the input overlay device comprises to determine an input based on the position of the touch and the position of the input overlay.

Example 22 includes the subject matter of any of Examples 17-21, and wherein the plurality of instructions further cause the compute device to display key mapping data on the touch screen displays.

Example 23 includes the subject matter of any of Examples 17-22, and wherein the one or more parameters of the input overlay device comprises an area of the touch screen display to be used as a touchpad.

Example 24 includes the subject matter of any of Examples 17-23, and wherein the plurality of instructions further cause the compute device to hide an area of the touch screen display to be used by the input overlay device from an operating system of the compute device; and emulate the input as a peripheral input to the operating system.

Example 25 includes the subject matter of any of Examples 17-24, and wherein the one or more parameters of the input overlay device comprise an indication of an area of the touch screen display that should be ignored.

The invention claimed is:

1. A compute device for interfacing with an input overlay device, the compute device comprising:
a touch screen display;
overlay determiner circuitry to:
determine that the input overlay device has been placed on top of at least a portion of the touch screen display; and
determine one or more parameters of the input overlay device, wherein the one or more parameters of the input overlay device includes an area of the touch screen display to be used as a touchpad for controlling a position of a cursor; and
touch input controller circuitry to:
detect a position of a touch on the portion of the touch screen display covered by the input overlay device; and
determine an input based on the position of the touch and the one or more parameters of the input overlay device.

2. The compute device of claim 1, wherein the touch input controller circuitry is further to detect a position of a hover on the portion of the touch screen display covered by the input overlay device.

3. The compute device of claim 1, wherein the overlay determiner circuitry is further to detect a position of one or more marker dots of the input overlay device in contact with the touch screen display, wherein the position of the one or more marker dots indicate the one or more parameters of the input overlay device.

4. The compute device of claim 3, wherein the compute device further includes an overlay configuration database; and
wherein the overlay determiner circuitry is further to retrieve overlay configuration data from the overlay configuration database based on the position of the one or more marker dots, wherein the overlay configuration data includes the one or more parameters of the input overlay device.

5. The compute device of claim 1, wherein the overlay determiner circuitry is further to determine a position of the input overlay device on the touch screen display,
wherein to determine an input based on the position of the touch and the one or more parameters of the input overlay device includes to determine an input based on the position of the touch and the position of the input overlay device.

6. The compute device of claim 1, wherein the compute device further includes display controller circuitry to display key mapping data on the touch screen display.

7. The compute device of claim 1, wherein the compute device further includes an operating system and operating system input controller circuitry, wherein the operating system input controller circuitry is to:
hide an area of the touch screen display to be used by the input overlay device from the operating system; and
emulate the input as a peripheral input to the operating system.

8. The compute device of claim 1, wherein the one or more parameters of the input overlay device define an area of the touch screen display relative to a position of the input overlay device where touch inputs are to be ignored by the compute device,
wherein the touch input controller circuitry is further to:
detect a position of a second touch on the touch screen display;
determine whether the position of the second touch is in the area of the touch screen display relative to the position of the input overlay device where touch inputs are to be ignored; and
ignore the second touch in response to a determination that the position of the second touch is in the area of the touch screen display relative to the position of the input overlay device where touch inputs are to be ignored.

9. The compute device of claim 1, further including the input overlay device, wherein the input overlay device includes:
a base including a top side and a bottom side, wherein the bottom side is to be placed on the touch screen display of the compute device;
one or more index dots on the bottom side of the base, wherein the one or more index dots indicate to the compute device that the input overlay device has been placed on the touch screen display; and
one or more push buttons configured to move, upon application of force, from a first position to a second position such that, when the input overlay device is placed on the touch screen display, the corresponding push button is in contact with the touch screen display in the second position and is not in contact with the touch screen display in the first position.

10. The compute device of claim 1, further including a second touch screen display, wherein the compute device has a clamshell configuration, wherein the touch screen display is disposed in a base portion of the compute device and the second touch screen display is disposed in a lid portion of the compute device,
wherein the one or more parameters of the input overlay device indicate that the input overlay device is a QWERTY keyboard,
wherein the one or more parameters of the input overlay device define an area of the touch screen display relative to a position of the input overlay device where touch inputs are to be ignored by the compute device,
wherein the touch input controller circuitry is further to:
detect a position of a second touch on the touch screen display;
determine whether the position of the second touch is in the area of the touch screen display relative to the position of the input overlay device where touch inputs are to be ignored; and
ignore the second touch in response to a determination that the position of the second touch is in the area of the touch screen display relative to the position of the input overlay device where touch inputs are to be ignored.

11. An input overlay device for a compute device, the input overlay device comprising:
a base including a top side and a bottom side, wherein the bottom side is to be placed on a touch screen display of the compute device;
one or more index dots on the bottom side of the base, wherein the one or more index dots indicate to the compute device that the input overlay device has been placed on the touch screen display; and
one or more push buttons configured to move, upon application of force, from a first position to a second position such that, when the input overlay device is placed on the touch screen display, the corresponding push button is in contact with the touch screen display in the second position and is not in contact with the touch screen display in the first position,
wherein each of the one or more push buttons includes a conductive segment extending from a top of the corresponding push button to a bottom of the corresponding push button such that, when a finger of a user is placed on the top of the corresponding push button when the corresponding push button is in the second position, the conductive segment electrically couples a capacitance of the finger of the user to the touch screen display.

12. The input overlay device of claim 11, wherein the base and the one or more push buttons are transparent or semi-transparent.

13. The input overlay device of claim 11, further including one or more marker dots, wherein a position of the one or more marker dots indicate one or more input overlay device parameters for the compute device to use to interpret touch input on the touch screen display.

14. The input overlay device of claim 13, wherein the input overlay device is a QWERTY keyboard.

15. The input overlay device of claim 11, wherein each of the one or more push buttons includes a capacitive or conductive element that is in contact with the touch screen display when the corresponding push button is in the second position.

16. The input overlay device of claim 11, further including one or more suction cups, wherein the one or more suction cups are configured to attach the input overlay device to the touch screen display.

17. The input overlay device of claim 11, wherein the base has an opening that, when the input overlay device is placed on the touch screen display of the compute device, defines an area of the touch screen display that is not covered by the input overlay device and that is suitable for use as a touchpad.

18. One or more non-transitory computer-readable media comprising a plurality of instructions stored thereon that, when executed, causes a compute device to:
determine that an input overlay device has been placed on top of at least a portion of a touch screen display of the compute device;
determine one or more parameters of the input overlay device, wherein the one or more parameters of the input overlay device define an area of the touch screen display relative to a position of the input overlay device where touch inputs are to be ignored by the compute device;
detect a position of a first touch on the portion of the touch screen display covered by the input overlay device;
determine an input based on the position of the first touch and the one or more parameters of the input overlay device;
detect a position of a second touch on the touch screen display;
determine whether the position of the second touch is in the area of the touch screen display relative to the position of the input overlay device; and
ignore the second touch in response to a determination that the position of the second touch is in the area of the touch screen display relative to the position of the input overlay device where touch inputs are to be ignored.

19. The one or more non-transitory computer-readable media of claim 18, wherein the plurality of instructions further cause the compute device to detect a position of a hover on the portion of the touch screen display covered by the input overlay device.

20. The one or more non-transitory computer-readable media of claim 18, wherein the plurality of instructions further cause the compute device to detect a position of one or more marker dots of the input overlay device in contact with the touch screen display, wherein the position of the one or more marker dots indicate the one or more parameters of the input overlay device.

21. The one or more non-transitory computer-readable media of claim 20, wherein the plurality of instructions further cause the compute device to:
retrieve an overlay configuration data from an overlay configuration database based on the position of the one or more marker dots, wherein the overlay configuration data includes the one or more parameters of the input overlay device.

22. The one or more non-transitory computer-readable media of claim 20, wherein the plurality of instructions further cause the compute device to determine the position of the input overlay device on the touch screen display,
wherein to determine an input based on the position of the first touch and the one or more parameters of the input overlay device includes to determine an input based on the position of the touch and the position of the input overlay device.

23. The one or more non-transitory computer-readable media of claim 18, wherein the plurality of instructions further cause the compute device to display key mapping data on the touch screen display.

24. The one or more non-transitory computer-readable media of claim 18, wherein the one or more parameters of the input overlay device includes an area of the touch screen display to be used as a touchpad, wherein the area of the touch screen display to be used as a touchpad is not covered by the input overlay device.

25. The one or more non-transitory computer-readable media of claim 18, wherein the plurality of instructions further cause the compute device to:
hide an area of the touch screen display to be used by the input overlay device from an operating system of the compute device; and
emulate the input as an input from a peripheral input device different from the touch screen display to the operating system.

\* \* \* \* \*